(12) United States Patent
Shin et al.

(10) Patent No.: US 12,294,070 B2
(45) Date of Patent: May 6, 2025

(54) BATTERY MODULE, AND BATTERY RACK AND POWER STORAGE DEVICE, EACH COMPRISING SAME BATTERY MODULE

(71) Applicant: LG ENERGY SOLUTION, LTD., Seoul (KR)

(72) Inventors: Eun-Gyu Shin, Daejeon (KR); Jeong-O Mun, Daejeon (KR); Jae-Min Yoo, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 575 days.

(21) Appl. No.: 17/639,147

(22) PCT Filed: Sep. 2, 2020

(86) PCT No.: PCT/KR2020/011784
§ 371 (c)(1),
(2) Date: Feb. 28, 2022

(87) PCT Pub. No.: WO2021/060735
PCT Pub. Date: Apr. 1, 2021

(65) Prior Publication Data
US 2022/0320628 A1 Oct. 6, 2022

(30) Foreign Application Priority Data
Sep. 24, 2019 (KR) .................. 10-2019-0117415

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS

| 2011/0159340 A1 | 6/2011 | Hu et al. |
| 2012/0009455 A1 | 1/2012 | Yoon |

(Continued)

FOREIGN PATENT DOCUMENTS

| CN | 108352588 A | 7/2018 |
| CN | 109891825 A | 6/2019 |

(Continued)

OTHER PUBLICATIONS

Extended European Search Report for European Application No. 20869563.5, dated Dec. 2, 2022.

(Continued)

*Primary Examiner* — Ula C Ruddock
*Assistant Examiner* — Mary Grace Byram
(74) *Attorney, Agent, or Firm* — Birch, Stewart, Kolasch & Birch, LLP (57) ABSTRACT

A battery module includes a plurality of battery cells stacked on each other; a module case configured to accommodate the plurality of battery cells; and a plurality of thermal runaway prevention units provided in the module case and respectively disposed between the plurality of battery cells along a stacking direction of the plurality of battery cells.

10 Claims, 8 Drawing Sheets

(51) Int. Cl.
　　　*H01M 10/625*　　(2014.01)
　　　*H01M 10/627*　　(2014.01)
　　　*H01M 10/647*　　(2014.01)
　　　*H01M 10/653*　　(2014.01)
　　　*H01M 10/6554*　(2014.01)
　　　*H01M 10/6555*　(2014.01)
　　　*H01M 10/6556*　(2014.01)
　　　*H01M 10/6557*　(2014.01)
　　　*H01M 10/6562*　(2014.01)
　　　*H01M 10/6563*　(2014.01)
　　　*H01M 10/6566*　(2014.01)
　　　*H01M 10/658*　　(2014.01)
　　　*H01M 50/20*　　 (2021.01)
　　　*H01M 50/204*　　(2021.01)
　　　*H01M 50/209*　　(2021.01)
　　　*H01M 50/211*　　(2021.01)
　　　*H01M 50/224*　　(2021.01)
　　　*H01M 50/24*　　 (2021.01)
　　　*H01M 50/251*　　(2021.01)
　　　*H01M 50/258*　　(2021.01)
　　　*H01M 50/291*　　(2021.01)

(52) U.S. Cl.
　　　CPC ....... *H01M 10/627* (2015.04); *H01M 10/647* (2015.04); *H01M 10/653* (2015.04); *H01M 10/6554* (2015.04); *H01M 10/6555* (2015.04); *H01M 10/6556* (2015.04); *H01M 10/6557* (2015.04); *H01M 10/6562* (2015.04); *H01M 10/6563* (2015.04); *H01M 10/6566* (2015.04); *H01M 10/658* (2015.04); *H01M 50/20* (2021.01); *H01M 50/204* (2021.01); *H01M 50/209* (2021.01); *H01M 50/211* (2021.01); *H01M 50/224* (2021.01); *H01M 50/24* (2021.01); *H01M 50/251* (2021.01); *H01M 50/258* (2021.01); *H01M 50/291* (2021.01); *H01M 2220/10* (2013.01)

(56) References Cited

U.S. PATENT DOCUMENTS

| | | | | |
|---|---|---|---|---|
| 2013/0084481 | A1* | 4/2013 | Yoon | H01M 50/103 429/99 |
| 2014/0017528 | A1* | 1/2014 | Uehara | H01M 10/482 429/61 |
| 2015/0221996 | A1* | 8/2015 | Jin | H01M 10/613 429/120 |
| 2015/0236387 | A1* | 8/2015 | Kasugai | H01M 50/548 429/120 |
| 2017/0331164 | A1 | 11/2017 | Kwon | |
| 2018/0067760 | A1 | 3/2018 | Son et al. | |
| 2018/0114957 | A1 | 4/2018 | Kim et al. | |
| 2018/0175468 | A1* | 6/2018 | Shin | H01M 10/6556 |
| 2018/0191041 | A1* | 7/2018 | Jeon | H01M 10/6551 |
| 2018/0248238 | A1* | 8/2018 | Pinon | H01M 10/613 |
| 2018/0287226 | A1 | 10/2018 | Voo et al. | |
| 2020/0038698 | A1 | 2/2020 | Ryu et al. | |

FOREIGN PATENT DOCUMENTS

| | | |
|---|---|---|
| CN | 209401710 U | 9/2019 |
| DE | 10 2009 028 920 A1 | 3/2011 |
| EP | 3 506 383 A1 | 7/2019 |
| JP | 2004-362879 A | 12/2004 |
| JP | 2010-218718 A | 9/2010 |
| JP | 2011-238374 A | 11/2011 |
| JP | 2012-18915 A | 1/2012 |
| JP | 2012-124319 A | 6/2012 |
| JP | 2012-174971 A | 9/2012 |
| JP | 2015-79655 A | 4/2015 |
| JP | 2015-211013 A | 11/2015 |
| JP | 6362300 B2 | 7/2018 |
| JP | 2018-523282 A | 8/2018 |
| KR | 10-2013-0033597 A | 4/2013 |
| KR | 10-2014-0007063 A | 1/2014 |
| KR | 10-1449103 B1 | 10/2014 |
| KR | 10-2015-0127863 A | 11/2015 |
| KR | 10-2016-0109045 A | 9/2016 |
| KR | 10-2017-0070795 A | 6/2017 |
| KR | 10-2017-0095040 A | 8/2017 |
| KR | 10-2017-0127273 A | 11/2017 |
| KR | 10-2018-0005456 A | 1/2018 |

OTHER PUBLICATIONS

International Search Report for PCT/KR2020/011784 mailed on Dec. 18, 2020.

\* cited by examiner

BATTERY MODULE, AND BATTERY RACK AND POWER STORAGE DEVICE, EACH COMPRISING SAME BATTERY MODULE

TECHNICAL FIELD

The present disclosure relates to a battery module, and a battery rack and an energy storage system including the battery module.

The present application claims priority to Korean Patent Application No. 10-2019-0117415 filed on Sep. 24, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

A conventional battery module is generally configured to include a plurality of battery cells stacked on each other and a module case for accommodating the plurality of battery cells. In the conventional battery module, a specific battery cell among the plurality of battery cells is overheated due to an abnormal situation in, the heat generated from the overheated battery cell is transferred to neighboring battery cells to cause thermal runaway, which may lead to greater risk such as explosion of the battery module.

Therefore, it is requested to find a way to dissipate the heat of the battery cell at which an abnormal condition occurs and prevent heat from being directly transferred to neighboring battery cells so as to prevent thermal runaway when the battery cell is overheated due to the abnormal situation.

DISCLOSURE

Technical Problem

The present disclosure is directed to providing a battery module, which may prevent thermal runaway when a specific battery cell is overheated due to an abnormal situation, and a battery rack and an energy storage system including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of battery cells stacked on each other in a stacking direction; a module case configured to accommodate the plurality of battery cells; and a plurality of thermal runaway preventers provided in the module case and respectively disposed between the plurality of battery cells along the stacking direction.

The battery module may further comprise a pair of heat transfer members disposed above and below the plurality of battery cells and disposed in contact with the plurality of thermal runaway preventers and an inner surface of the module case.

Each of the plurality of thermal runaway preventers may include a pair of cooling fins respectively disposed in contact with a side surface of a facing battery cell; and an insulation member disposed between the pair of cooling fins and having a predetermined length along a longitudinal direction of the plurality of battery cells.

Opposite ends of the pair of cooling fins may be in contact with the pair of heat transfer members, respectively.

Each of the pair of cooling fins may include a fin body provided in contact with the side surface of the facing battery cell; and elastic portions formed at opposite ends of the fin body and respectively provided in contact with the heat transfer members.

Each elastic portion may include an inclined part configured to extend with a slope from the fin body at a predetermined angle and disposed to be spaced apart from an end of the battery cell by a predetermined distance; and a horizontal part bent from the inclined part and provided in contact with one of the pair of heat transfer members.

Distal ends of the horizontal part may be located above and below the insulation member, respectively.

The horizontal part may be in surface contact with each of the pair of heat transfer members.

In addition, the present disclosure further provides a battery rack, comprising: at least one battery module according to the above embodiments; and a rack case configured to package the at least one battery module.

Moreover, the present disclosure further provides an energy storage system, comprising at least one battery rack according to the above embodiments.

Advantageous Effects

According to various embodiments as described above, it is possible to provide a battery module, which may prevent thermal runaway when a specific battery cell is overheated due to an abnormal situation, and a battery rack and an energy storage system including the battery module.

In addition, according to various embodiments as described above, it is possible to provide a battery module, which may disperse heat from a battery cell at which an abnormal situation occurs and prevent heat from being directly transferred to neighboring battery cells, and a battery rack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
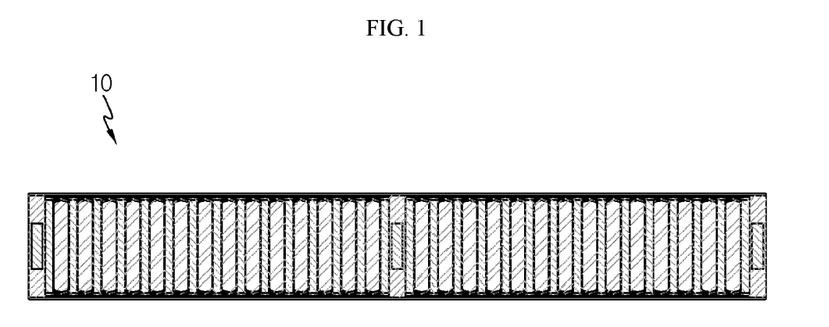
FIG. 1 is a diagram for illustrating a battery module according to an embodiment of the present disclosure.
Figure 2:
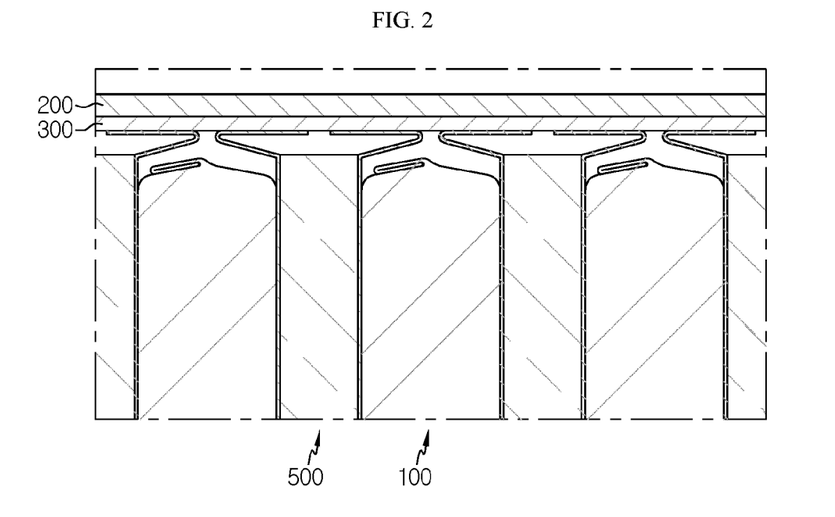
FIG. 2 is a diagram for illustrating a main part of FIG. 1.
Figure 3:
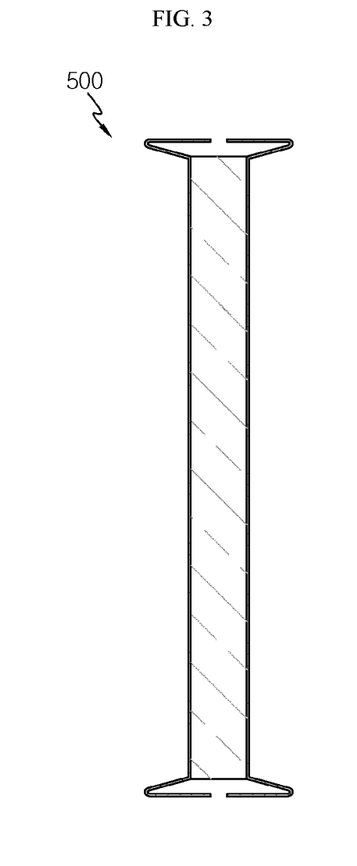
FIG. 3 is a diagram for illustrating a thermal runaway prevention unit of FIG. 2.
Figure 4:
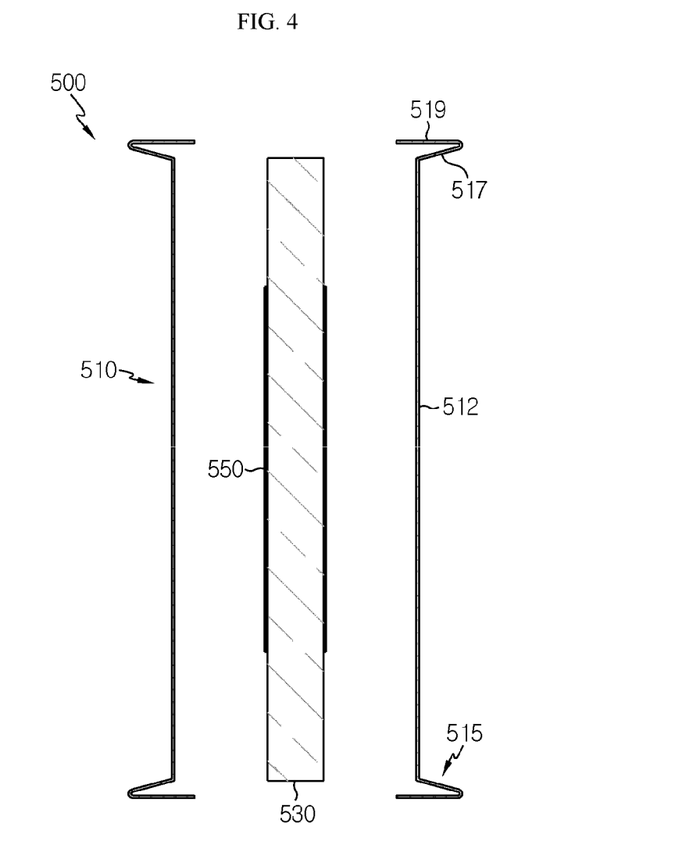
FIG. 4 is an exploded view showing the thermal runaway prevention unit of FIG. 3.

FIG. 1 is a diagram for illustrating a battery module according to an embodiment of the present disclosure, FIG. 2 is a diagram for illustrating a main part of FIG. 1, FIG. 3 is a diagram for illustrating a thermal runaway prevention unit of FIG. 2, and FIG. 4 is an exploded view showing the thermal runaway prevention unit of FIG. 3.

Referring to FIGS. 1 to 4, a battery module 10 may include a battery cell 100, a module case 200, a heat transfer member 300, and a thermal runaway prevention unit 500.

At least one battery cell 100 or a plurality of battery cells 100 may be provided. Hereinafter, in this embodiment, it will be described that a plurality of battery cells 100 are provided.

The plurality of battery cells 100 may be stacked on each other to be electrically connected to each other. The plurality of battery cells 100 are secondary batteries and may be provided as at least one of pouch-type secondary batteries, rectangular secondary batteries, and cylindrical secondary batteries. Hereinafter, in this embodiment, the plurality of battery cells 100 will be described as pouch-type secondary batteries.

The module case 200 may accommodate the plurality of battery cells 100. To this end, the module case 200 may have an accommodation space capable of accommodating the plurality of battery cells 100.

The heat transfer member 300 is disposed above and below the plurality of battery cells 100, and may be disposed between the plurality of thermal runaway prevention units 500, explained later, and the module case 200. The heat transfer member 300 may be made of a thermal interface material.

The heat transfer member 300 may be provided in a pair. The pair of heat transfer members 300 may be disposed in contact with the plurality of thermal runaway prevention units 500, explained later, and the module case 200. Specifically, the pair of heat transfer members 300 are disposed in contact with an upper inner surface and a lower inner surface of the module case 200, and may be in contact with the plurality of facing thermal runaway prevention units 500.

The thermal runaway prevention unit 500 is provided to prevent thermal runaway toward neighboring battery cells 100 when overheating occurs due to an abnormal situation of a specific battery cell 100 among the battery cells 100, and may be provided in plural.

The plurality of thermal runaway prevention units 500 is provided inside the module case 200, and may be disposed between the plurality of battery cells 100 along a stacking direction of the plurality of battery cells 100.

Each of the plurality of thermal runaway prevention units 500 may include a pair of cooling fins 510, an insulation member 530, and an adhesion member 550.

The pair of cooling fins 510 may be disposed in contact with a side surface of the facing battery cell 100. The pair of cooling fins 510 may have a length equal to or greater than the length of the side surface of the battery cell 100.

The pair of cooling fins 510 may be made of a metal material with high thermal conductivity. The pair of cooling fins 510 may transfer the heat generated from the battery cell 100 toward the heat transfer member 500. To this end, both ends 515 of the pair of cooling fins 510 may be in contact with the pair of heat transfer members 500.

Each of the pair of cooling fins 510 may include a fin body 512 and an elastic portion 515.

The fin body 512 may be in contact with a side surface of the facing battery cell 100. To this end, the fin body 512 may have a predetermined length and area capable of covering the facing battery cell 100.

The elastic portion 515 is formed at both ends of the fin body 512, and may be in contact with each heat transfer member 300. Through the elastic portion 515, when the thermal runaway prevention unit 500 is mounted inside the module case 200, it is possible to more stably arrange the thermal runaway prevention unit 500 in contact with the heat transfer member 300 even if assembly tolerances occur.

The elastic portion 515 may include an inclined part 517 and a horizontal part 519.

The inclined part 517 extends with a slope at a predetermined angle from the fin body 512, and may be disposed to be spaced apart from both ends of the battery cell 100 by a predetermined distance.

The horizontal part 519 is bent from the inclined part, and may be in contact with each heat transfer member. The horizontal part 519 may be in surface contact with each heat transfer member 300. Accordingly, the heat transfer efficiency of the pair of cooling fins 510 may be further increased.

Distal ends of the horizontal part 519 may be located above and below the insulation member 530. That is, the distal ends of the horizontal part 519 may be disposed above and below the insulation member 530, rather than above and below the battery cell 100 from the inclined part 517.

Accordingly, when the thermal runaway prevention unit 500 is assembled or installed or when the horizontal part 519 is moved due to external shock, it is possible to effectively prevent a risk of unexpected damage to the battery cell 100 caused by the distal ends of the horizontal part 519.

The insulation member 530 is disposed between the pair of cooling fins 510, and may have a predetermined length along the longitudinal direction of the plurality of battery cells 100. When the battery cell 100 is overheated according to an abnormal situation, the insulation member 530 may prevent the heat from being directly transferred in a horizontal direction from the overheated battery cell 100 toward neighboring battery cells 100.

The adhesion member 550 is provided at both sides of the insulation member 530, and may couple the insulation member 530 and the pair of cooling fins 510 to each other. The adhesion member 550 may be provided as a double-sided tape.

Figure 5:
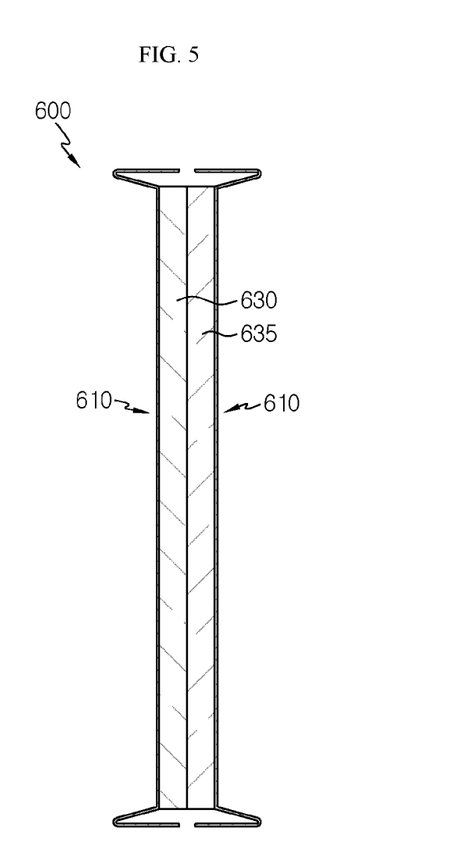
FIG. 5 is a diagram for illustrating a thermal runaway prevention unit according to another embodiment of the present disclosure.

FIG. 5 is a diagram for illustrating a thermal runaway prevention unit according to another embodiment of the present disclosure.

A thermal runaway prevention unit 600 according to this embodiment is similar to the thermal runaway prevention unit 500 of the former embodiment. Thus, hereinafter, features substantially identical or similar to those of the former embodiment will not be described in detail again, and features different from the former embodiment will be described in detail.

Referring to FIG. 5, the thermal runaway prevention unit 600 may include a pair of cooling fins 610 and a plurality of insulation members 630, 635.

The pair of cooling fins 610 are substantially identical or similar to the pair of cooling fins 510 of the former embodiment, and thus will not be described in detail again.

The plurality of insulation members 630, 635 may be stacked on each other and disposed between the pair of cooling fins 610. The plurality of insulation members 630, 635 may be coupled to each other by the adhesion member (not shown) and may be coupled to the facing cooling fins 610, respectively.

In this embodiment, since the insulation members 630, 635 are provided in plural, when the battery cell 100 is overheated due to an abnormal situation, it is possible to more effectively prevent the heat from being directly transferred in a horizontal direction from the overheated battery cell 100 toward neighboring battery cells 100.

Hereinafter, a thermal runaway prevention mechanism of the battery module 10 according to this embodiment through the thermal runaway prevention unit 500 when a specific battery cell 100 is overheated due to an abnormal situation will be described in more detail.

Figure 6:
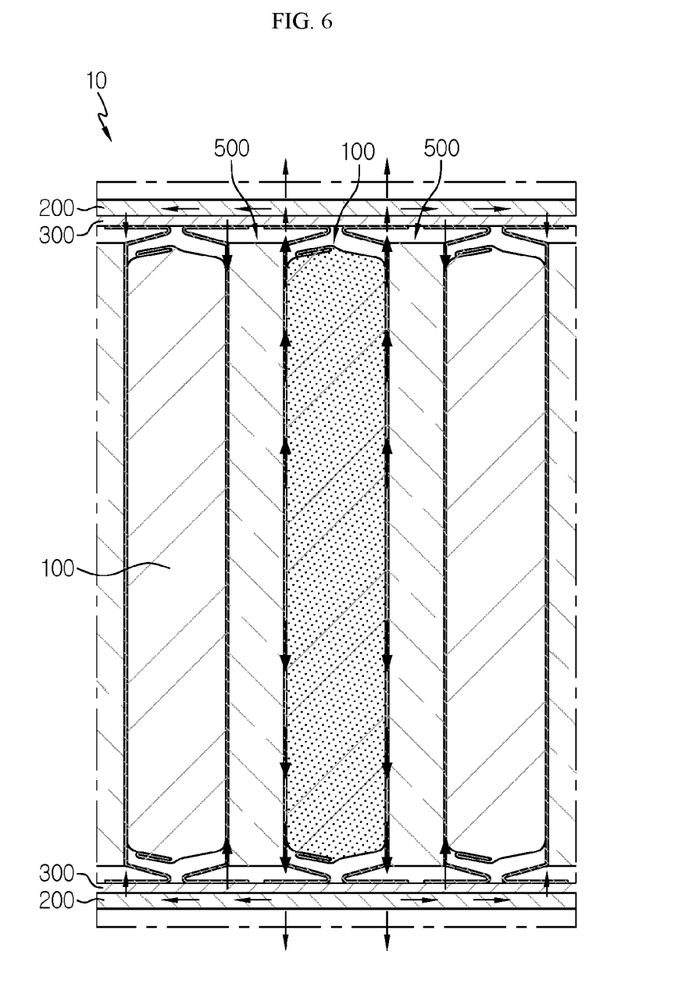
FIGS. 6 and 7 are diagrams for illustrating a process of preventing thermal runaway when an abnormal situation occurs at a battery cell of the battery module of FIG. 1.
Figure 7:
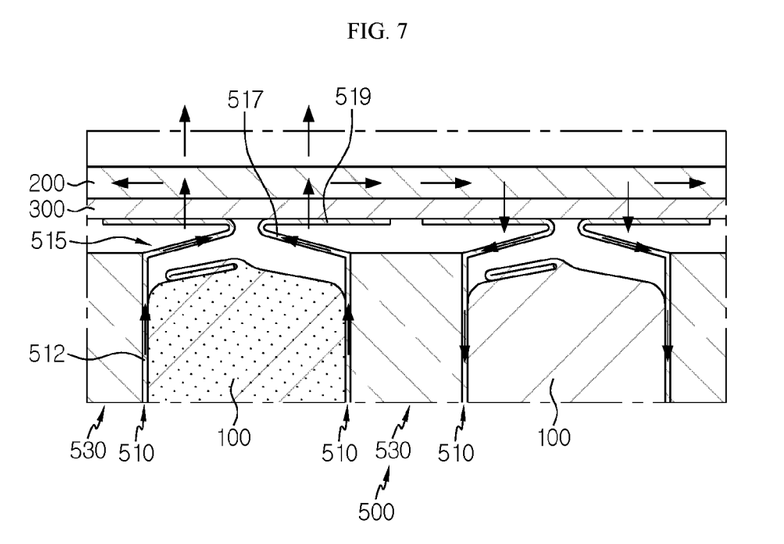

FIGS. 6 and 7 are diagrams for illustrating a process of preventing thermal runaway when an abnormal situation occurs at a battery cell of the battery module of FIG. 1.

Referring to FIGS. 6 and 7, in the battery module 10, at least one specific battery cell 100 (see the battery cell in the middle of FIG. 6 and the battery cell at the left side of FIG. 7) may be overheated due to an abnormal situation.

At this time, the heat generated from the specific battery cell 100 at which the abnormal situation occurs may be rapidly transferred to the heat transfer member 300 and the module case 200 through the cooling fin 510 of the thermal runaway prevention unit 500 in contact with the specific battery cell 100.

After that, a part of the heat generated from the specific battery cell 100 may escape from the module case 200, and also a part of the heat may be evenly distributed to the module case 200, the heat transfer member 300, and the cooling fins 510 of other thermal runaway prevention units 500.

The battery module 10 according to this embodiment may effectively prevent thermal runaway by means of the heat dissipation when a specific battery cell 100 is overheated due to an abnormal situation.

Moreover, the insulation members 530 of the thermal runaway prevention units 500 disposed at both sides of the overheated specific battery cell 100 may effectively block the heat of the overheated specific battery cell 100 from being directly transferred in the horizontal direction toward the battery cells 100 disposed close thereto.

As described above, when a specific battery cell 100 is overheated due to an abnormal situation the battery module 10 according to this embodiment may prevent thermal runaway by dispersing the heat of the specific battery cell 100 at which an abnormal situation occurs and also prevent the heat from being directly transferred to neighboring battery cells 100, by means of the thermal runaway prevention unit 500.

Therefore, by means of the thermal runaway prevention unit 500, the battery module 10 according to this embodiment may secure the safety of the battery module 10 and effectively prevent greater dangers such as explosion of the battery module 10 from being caused by the abnormal situation of the specific battery cell 100.

Figure 8:
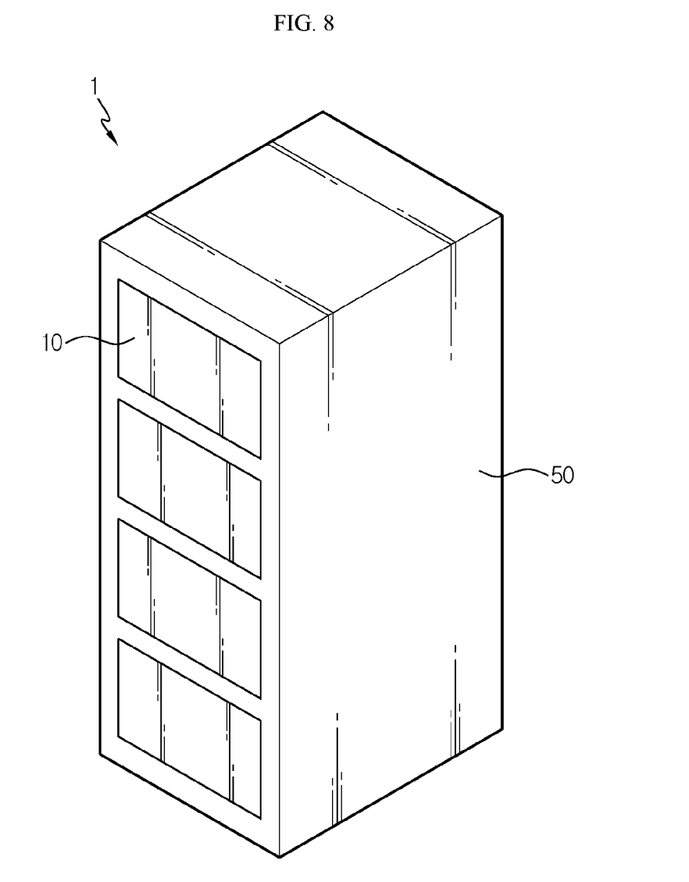
FIG. 8 is a diagram for illustrating a battery rack according to an embodiment of the present disclosure.

FIG. 8 is a diagram for illustrating a battery rack according to an embodiment of the present disclosure.

Referring to FIG. 8, a battery rack 1 may include at least one or a plurality of battery modules 10 of the former embodiment and a rack case 50 for accommodating the at least one battery module or the plurality of battery modules 10.

Since the battery rack 1 of this embodiment includes the battery module 10 of the former embodiment, the battery rack 1 may have all advantages of the battery module 10 of the former embodiment.

Figure 9:
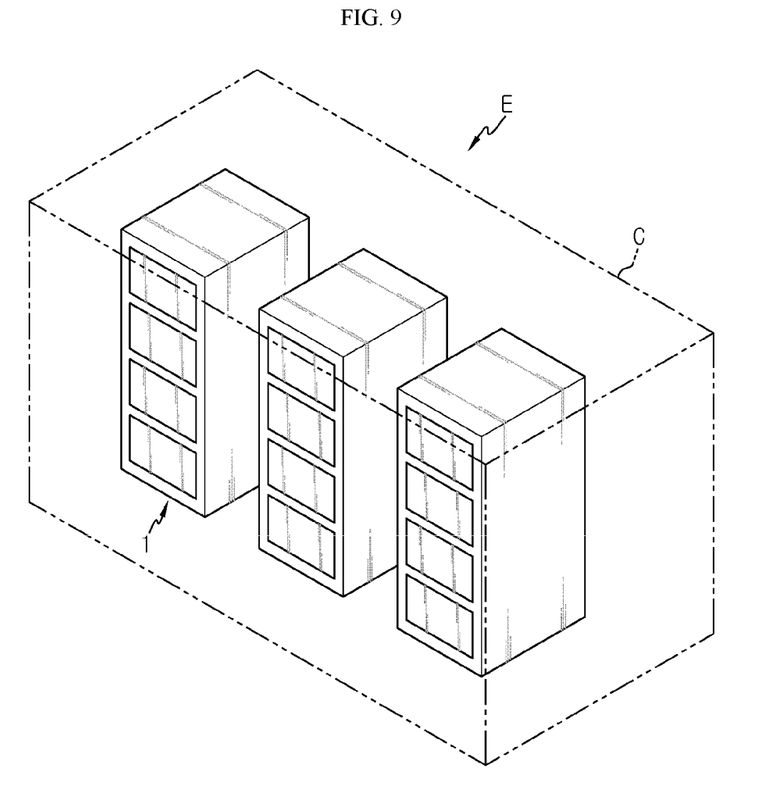
FIG. 9 is a diagram for illustrating an energy storage system according to an embodiment of the present disclosure.

FIG. 9 is a diagram for illustrating an energy storage system according to an embodiment of the present disclosure.

Referring to FIG. 9, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

Since the energy storage system E of this embodiment includes the battery rack 1 of the former embodiment, the energy storage system E may have all advantages of the battery rack 1 of the former embodiment. Meanwhile, the battery rack 1 may also be applied to other devices or instruments, for example, an electric vehicle, using the battery rack 1 as an energy source, besides the energy storage system E.

According to various embodiments as described above, it is possible to provide a battery module 10, which may prevent thermal runaway when a specific battery cell 100 is overheated due to an abnormal situation, and a battery rack 1 and an energy storage system E including the battery module.

In addition, according to various embodiments as described above, it is possible to provide a battery module 10, which may disperse heat from a battery cell 100 at which an abnormal situation occurs and prevent heat from being directly transferred to neighboring battery cells 100, and a battery rack 1 and an energy storage system E including the battery module.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells stacked on each other in a stacking direction;
   a module case configured to accommodate the plurality of battery cells; and
   a plurality of thermal runaway preventers provided in the module case and respectively disposed between the plurality of battery cells along the stacking direction,
   wherein each of the plurality of thermal runaway preventers includes a pair of cooling fins to contact a respective one of the plurality of battery cells, each of the pair of cooling fins having a fin body and at least one end of the fin body having a first section extending outwardly from the at least one end of the fin body and a second section extending inwardly from the first section;
   wherein the first section is an inclined part configured to extend with a slope from the fin body at a predetermined angle and disposed to be spaced apart from an end of the battery cell by a predetermined distance; and
   wherein the second section is a horizontal part bent from the inclined part and provided in contact with one of the pair of heat transfer members.

2. The battery module according to claim 1, further comprising:
   a pair of heat transfer members disposed above and below the plurality of battery cells and disposed in contact with the plurality of thermal runaway preventers and an inner surface of the module case.

3. The battery module according to claim 2, wherein each of the plurality of thermal runaway preventers further includes:
   an insulation member disposed between the pair of cooling fins and having a predetermined length along a longitudinal direction of the plurality of battery cells.

4. The battery module according to claim 2, wherein opposite ends of the pair of cooling fins are in contact with the pair of heat transfer members, respectively.

5. The battery module according to claim 1,
   wherein each end of the fin body has the first section and the second section respectively provided in contact with the heat transfer members.

6. The battery module according to claim 1, wherein distal ends of the horizontal part are located above and below the insulation member, respectively.

7. The battery module according to claim 1, wherein distal ends of the horizontal part are located above and below the insulation member, respectively.

8. A battery rack, comprising:
   at least one battery module as defined in claim 1; and
   a rack case configured to package the at least one battery module.

9. An energy storage system, comprising:
   at least one battery rack as defined in claim 8.

10. A battery module, comprising:
    a plurality of battery cells stacked on each other in a stacking direction;
    a module case configured to accommodate the plurality of battery cells; and
    a plurality of thermal runaway preventers provided in the module case and respectively disposed between the plurality of battery cells along the stacking direction,
    wherein each of the plurality of thermal runaway preventers includes a pair of cooling fins to contact a respective one of the plurality of battery cells, each of the pair of cooling fins having a fin body and at least one end of the fin body having a first section extending outwardly from the at least one end of the fin body and a second section extending inwardly from the first section,
    wherein adjacent thermal runaway preventers of the plurality of thermal runaway preventers contact a same battery cell of the plurality of battery cells, and
    wherein one of the pair of cooling fins from each of the adjacent thermal runaway preventers extends over the same battery cell and do not contact one another.

* * * * *